Figure 1:
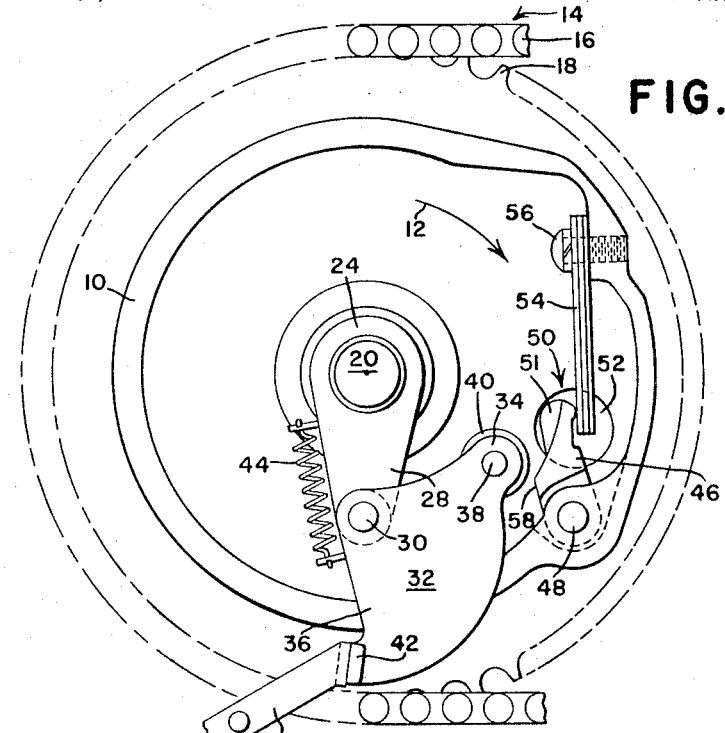

Feb. 14, 1967   T. M. BARNES ETAL   3,303,913
TORQUE-LIMITING CLUTCH
Filed Dec. 28, 1964   2 Sheets-Sheet 1

INVENTORS
H. E. deBUHR
T. M. BARNES
BY John M Nolan
ATTORNEY

Feb. 14, 1967     T. M. BARNES ETAL     3,303,913
TORQUE-LIMITING CLUTCH
Filed Dec. 28, 1964     2 Sheets-Sheet 2

INVENTORS
H. E. deBUHR
T. M. BARNES
BY John M Nolan
ATTORNEY

United States Patent Office 3,303,913
Patented Feb. 14, 1967

3,303,913
TORQUE-LIMITING CLUTCH
Theodore M. Barnes and Harold E. de Buhr, Ottumwa, Iowa, assignors to Deere & Company, Moline, Ill., a corporation of Delaware
Filed Dec. 28, 1964, Ser. No. 421,354
11 Claims. (Cl. 192—56)

This invention relates to a torque-limiting clutch and more particularly to means for limiting the torque transmitted through a self-interrupting type clutch.

Self-interrupting clutches are well known in the art and are utilized to transmit a torque from a constantly rotating part to an intermittently rotating part. Such a mechanism is often used on a hay baler, for example, to intermittently drive the bale-tying mechanism, the clutch mechanism being activated when the bale reaches a predetermined size to rotate the tying mechanism drive member one revolution for driving the mechanism through one tying cycle.

In many cases it is desirable to limit the torque transmitted through such a clutch and provide for disengagement of the clutch if a predetermined output torque is reached. For example, in a bale-tying mechanism, such as described above, if the travel of the needles is impeded, or the mechanism becomes fouled, continued application of force could damage the mechanism components. Thus if the torque requirement to operate the mechanism exceeds a predetermined value due to a malfunction in the mechanism, it is desirable that the drive means disengage.

To accomplish this, shear pins have previously been utilized to limit the output torque. However, shear pins must be replaced after once performing their function, resulting in considerable down-time for the machine. Slip clutches could also be utilized to limit the output torque. However, the clutch linings tend to freeze and, in addition, the use of a slip clutch results in an added mechanism.

The present invention provides for such torque-limiting means as an integral part of the self-interrupting clutch. In addition, the torque-limiting device automatically resets after disengaging the clutch, and includes means for adjustably setting the torque level at which disengagement will be accomplished.

Accordingly, the principal object of the present invention is to provide means for automatically disengaging a clutch mechanism when a predetermined output torque is reached.

Another object is to provide means for adjustably setting the torque level at which the clutch will disengage.

Another object is to provide such torque-limiting means as an integral part of a self-interrupting type clutch.

Another object is to provide such a device for disengaging a clutch mechanism at a predetermined torque level wherein the device automatically resets itself for further engagement of the clutch.

Still another object is to provide such a device of simple and rugged construction, inexpensive to manufacture and maintain.

These and other objects of the invention will become apparent from a consideration of the following detailed description and drawings wherein an embodiment of the invention is disclosed.

Figure 2:
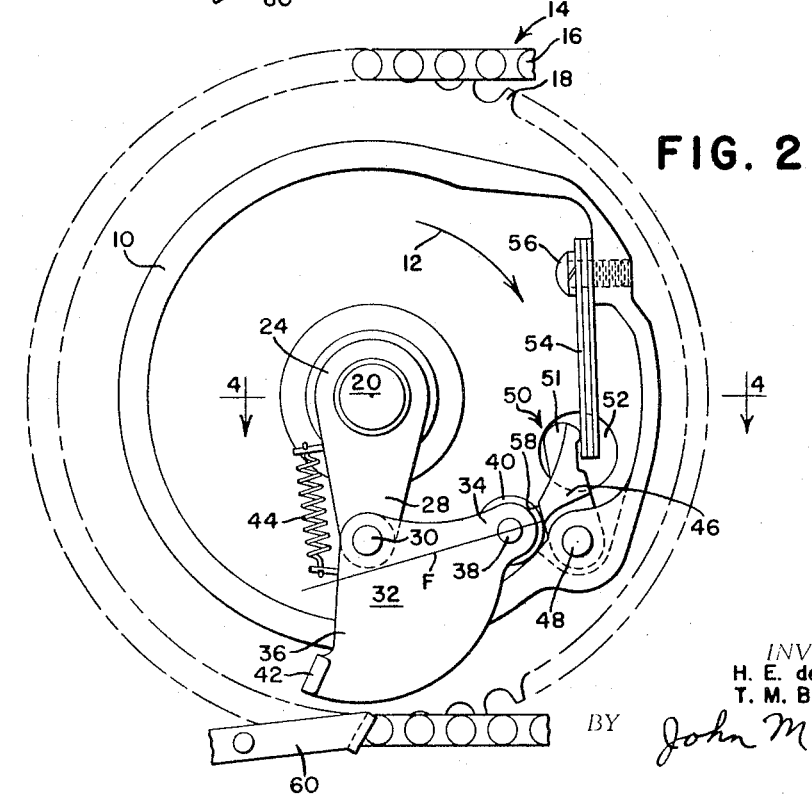
Figure 3:
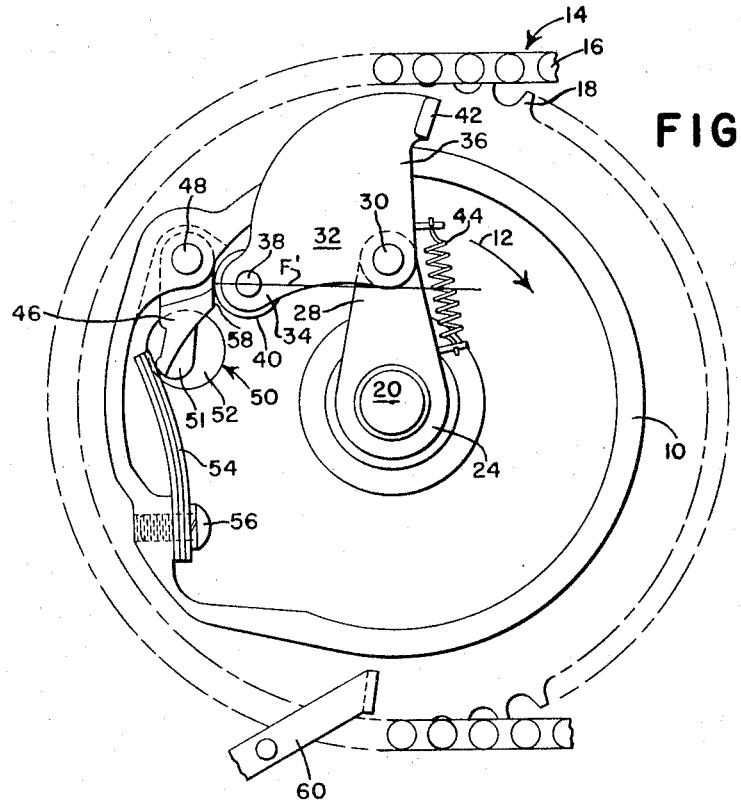
Figure 4:
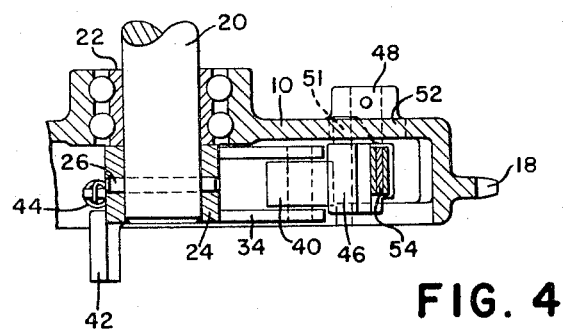

In the drawings:
FIG. 1 is an elevational view showing the clutch mechanism when the clutch is disengaged.
FIG. 2 is a similar view showing the clutch mechanism when the clutch is engaged.
FIG. 3 is a similar view showing the clutch mechanism in the process of disengagement when the output torque requirement exceeds the torque limit.
FIG. 4 is a sectional view along the line 4—4 of FIG. 2.

Referring now to the drawings, there is shown a self-interrupting type clutch having a drum-like driving member 10 constantly rotated in the direction of the arrow 12 by a power source (not shown) through a drive means 14, here shown as a drive chain 16 engaging a sprocket 18 formed by the outer periphery of the driving member 10.

A driven member 20, shown as a shaft on which the driving member 10 is journaled through a bearing 22, has a hub 24 affixed thereto, the hub including a radial arm 28 which carries a pivot 30 parallel to and radially spaced from the axis of the driven member.

A pawl 32, in the form of a bell crank having a drive arm 34 and a control arm 36, is rockably mounted on the pivot 30. The drive arm 34 extends from the pivot 30 in a direction counter to the direction of rotation of the drive member and carries a roller 40 at its end, the roller being rotatably mounted on a pivot 38, parallel to the pivot 30. The control arm 36 extends in a generally radial direction from both the pivot 30 and the axis of the driven member 20, and terminates in a lateral, axial face 42. The pawl 32 is biased toward a rotation about its pivot 30 in the same direction as the rotation of the driving member 10 by means of a tension spring 44 having one end affixed to the hub 28 and the other end affixed to the pawl, the roller 40 being urged toward engagement with the inner periphery of the drum-like driving member 10.

Projecting inwardly from the inner periphery of the driving member 10 is an engaging member 46 which is rockably mounted to the driving member on a pivot 48 parallel to the pivot 30. The rocking movement of the engaging member about its pivot is limited by a stop means 50 formed by a lug 51 projecting from the engaging member parallel to the axis of the drive member 10 through an aperture 52 in the driving member, the aperture being parallel to and radially offset from the axis of the driving member, the lug seating against opposite sides of said aperture to limit the movement of the engaging member.

The engaging member 46 is biased radially inwardly by spring means 54, here shown as a flat, multiple-leaf-type spring having one end affixed to the inner periphery of the driving member 10 by a screw 56 and the other end seating against the engaging member 46, biasing the lug 51 against the inner side of the aperture 52. The advance side of the engaging member 46, with reference to the direction of driving member rotation, forms a flat cam surface 58 for engaging the roller 40.

A trip means 60, rockable on supporting structure (not shown) external to the clutch, disengageably seats against the face 42 on the pawl 32, the roller 40 being held by the pawl 32 out of engagement with the cam surface 58 when the trip means engages the pawl as shown in FIG. 1.

In operation, the drive means 14 constantly rotates the driving member 10 in the direction of the arrow 12. When the trip lever 60 engages the face 42 on the control arm 36, the pawl 32 is rotated around the pivot 30 against the bias of the spring 44 to the position shown in FIG. 1, the roller 40 clearing the engaging member 46. Consequently, the clutch is disengaged, the driven member 20 remaining rotationally immobile.

When the trip member 60 is actuated to disengage the pawl 32, as shown in FIG. 2, the pawl is rotated about its pivot 30 by the spring 44 until the roller 40 engages the inner periphery of the drum-like driving member 10. The roller moves along said periphery until it engages the cam surface 58 on the engaging member 48, as shown in FIG. 2. At this point, the torque of the driving member 10 is transmitted to the driven member 20 through the driving arm 34 of the pawl 32 which rotates the hub 24 and, consequently, the driven member 20.

Since a cam surface exerts a force on a rolling cam follower along a plane normal to the cam surface through the axis of the follower pivot, the force which the cam surface 58 exerts on the drive arm 34 through the roller 40 will be exerted along the line F in FIG. 2 when the engaging member is in the position shown. As is apparent, the line of force is offset from the axis of the pivot 30, and the resulting moment arm creates a torque on the pawl 32 about its pivot 30 in the same direction as the biasing force of the spring 44 and the direction of rotation of the driving member 10, said additional torque urging the roller into engagement with the inner periphery of the driving member 10 and the engaging member 46.

The angle of the cam surface and consequently the direction of the force exerted by the cam surface depends on the rotational position of the engaging member 46 about its pivot 48 within the limits imposed by the stop means 50. When the driven member 20 requires a relatively small amount of torque, the force exerted through the engaging member 46 is small, and the engaging member will be maintained in the position as shown in FIG. 2 by the spring means 54. As the torque demand increases, thereby increasing the force exerted through the engaging member, the reaction force tends to rotate the engaging member around its pivot against the force exerted by the spring means 54. As the engaging member rotates, the angle of the cam surface and consequently the direction of the line of force changes relative to the pivot 30. When the line of force intersects the axis of the pivot, the additional torque on the pawl urging engagement of the roller against the cam surface disappears, and the relatively small torque exerted by the spring 44 is the sole engaging force.

If the torque demand increases to the extent that the engaging member 46 rotates about its pivot and deflects the spring means to the position shown in FIG. 3, the force exerted by the engaging member will be along the line F', and a torque will be exerted on the pawl about the pivot 30 counter to the torque exerted by the spring 44. As soon as said counter torque exceeds the torque exerted by the spring 44, the pawl rotates about its pivot, the roller 40 moving along the cam surface 58 away from the inner periphery of the driving member until it clears the cam surface, at which time the clutch disengages.

Since the driving member and the driven member are no longer engaged and no force is applied through the engaging member, the spring means 54 will return the engaging member to its normal position as shown in FIGS. 1 and 2, and the spring 44 will return the roller against the inner periphery of the driving member, automatically resetting the clutch components for engagement on the next revolution of the driving member.

The torque level at which the engaging member will deflect a sufficient distance to accomplish the above described disengagement depends on the stiffness of the spring means 54. Thus to raise the torque limit of the clutch, additional leaves could be added to the spring or the spring leaves could be replaced by spring leaves of stiffer material. Conversely, to decrease the torque limit, a more flexible spring material could be utilized or individual leaves of the spring could be removed.

It is also noted that the springs partially absorb the impact of the roller 40 striking the engaging member 46 when the clutch is initially engaged, thereby protecting the components.

If the predetermined torque level is not exceeded, the roller and the engaging member will remain engaged for rotation of the driving member and driven member in unison until the tripping means interrupts the rotation of the pawl 32 by engaging the face 42 of the control member 36 and consequently rotating the pawl out of engagement with the engaging member 36, as shown in FIG. 1.

While it is conventional that the tripping means move back into an interrupting position immediately after tripping, thereby allowing only one intermittent revolution of the driven member, such as in a bale-tying mechanism, the tripping arm can be controlled to allow any desired number of revolutions of the driven member at any interval.

Other features and advantages of the present invention will readily occur to those skilled in the art, as will many modifications and alterations in the preferred embodiment of the invention described herein, all of which may be achieved without departing from the spirit and the scope of the invention.

What is claimed is:

1. In a rotating clutch of the class described having a rotatable drum-like driving member, a rotatable driven member coaxially journaled for intermittent rotation with the driving member, a pawl pivotally connected to the driven member about an axis parallel to and spaced from the driven member axis and carrying a roller, said pawl being swingable into a driving position wherein the roller operatively engages the driving member for a rotation of the members in unison or into a position wherein the roller clears the driving member, and means for controlling the position of said pawl about its axis, the combination therewith of means for limiting the torque transmitted to the driving member comprising, an engaging member pivotally mounted on said driving member for limited movement relative thereto, extending from the inner periphery of the driving member and having a relatively flat cam surface on the advance side in relation to the direction of rotation of the driving member, the cam surface engaging the roller when the pawl is positioned for engagement, stop means associated with the engaging member for limiting the movement of said engaging member, the cam surface moving into roller engaging and disengaging angles with the limited movement of the engaging member, the driving force transmitted through the engaging member urging the engaging member toward a roller disengaging position, and spring means acting on the engaging member for biasing said member toward a roller engaging position, the spring means deflecting under said driving force a sufficient distance to allow the movement of the engaging member into a roller disengaging position when the driving force reaches a predetermined value.

2. The invention defined in claim 1 wherein the spring means comprises a flat spring having one end affixed to the driving member and the other end seating against the engaging member.

3. The invention defined in claim 2 wherein the flat spring comprises a plurality of adjacent leaves, the individual leaves being removable and replaceable.

4. The invention defined in claim 2 wherein the stop means comprises an aperture through said driving member and a lug extending from the engaging member into said aperture.

5. A rotary clutch comprising, a rotatable drum-like driving member carrying a pivot radially spaced from and parallel to the driving member axis, an engaging member mounted on said pivot for limited rotational movement relative to said driving member and extending from the inner periphery of the driving member, the engaging member having a relatively flat cam surface on the advance side in relation to the direction of driving member rotation, a rotatable driven member coaxially journalled for rotation relative to the driving member and including a hub, a pawl pivotally mounted on said hub on an axis radially spaced from and parallel to the driven member axis, the pawl including a radial control arm and a driving arm extending from the pivot in a retard direction relative to the direction of driving member rotation, and carrying a roller at the end of the driving arm for engaging the cam surface for rotating the driving member and driven member in unison, spring means urging the pawl into a cam surface engaging position, trip means having a trip position clear of the rotational path of the control arm and a stop position engaging the control arm for rotating the pawl against the spring bias out of engagement with the cam surface, the engaging member being swingable to move the cam surface into roller engaging and disengaging angles, the driving force transmitted through the engaging member urging the engaging member toward a roller disengaging position, and spring means acting on the engaging member for biasing the engaging member toward a roller engaging position, the spring means deflecting under said driving force when the force transmitted through the engaging member reaches a predetermined value to permit the movement of the engaging member into a disengaging position.

6. The invention defined in claim 5 wherein the spring means is a flat spring having one end affixed to the inner periphery of the driving member and the other end seating against the engaging member.

7. The invention defined in claim 6 wherein the flat spring is of a leaf-spring type formed by a plurality of adjacent leaves, the stiffness of the spring being adjustable by adding, subtracting, or replacing at least one spring leaf.

8. A rotary clutch comprising: a rotating drive member; an independently, coaxially rotatable driven member; an engaging member pivotally mounted on one of said members for swinging about an axis parallel to the drive and driven member axis between a first and a second position; a cam surface on the engaging member swingable into different angular positions therewith; a spring means operative between the engaging member and the member on which it is mounted, biasing the engaging member toward its first position; a pawl mounted on the other of said rotatable members and movable between a first position wherein it is engageable with the cam surface of the engaging member when the engaging member is in its first position to positively drivingly connect the members for rotation in unison, and a second position wherein it clears the engaging member, the driving force transmitted through the engaging member when the drive and driven members are rotating in unison opposing the bias of the spring means and urging the engaging member toward its second position, the spring means deflecting a sufficient distance when the driving force reaches a predetermined value to permit the shifting of the engaging member to its second position wherein the cam surface shifts the pawl to its second position to disconnect the drive and driven members.

9. The invention defined in claim 8 and including a control means operatively associated with the pawl to shift the pawl into its second position independently of the engaging member.

10. An intermittent drive torque limiting clutch comprising: a constant rotation drive member; an engaging member; a pivot means movably mounting the engaging member on the drive member for shifting between first and second positions; a spring means operative between the drive member and the engaging member for biasing it toward its first position; an intermittently driven member coaxially journaled relative to the drive member; a pawl mounted on the driven member and shiftable thereon between a first position wherein it engages the engaging member to positively drivingly interconnect the drive and driven members for rotation in unison and a second position wherein it clears the engaging member; a control means operatively connected to the pawl for moving it into either of its alternate positions; a cam means operatively associated with the pawl and the engaging member to shift the pawl into its second position when the engaging member shifts into its second position, the driving force being exerted through the pawl, the cam surface and the engaging member and part of the driving force being exerted through the pivot means when the members are rotating in unison, opposing the bias of the spring means and shifting the engaging member into its second position after it reaches a predetermined value to disconnect the drive and driven members.

11. The invention defined in claim 10 wherein the control means includes a second spring means operative between the pawl and the driven member and biasing the pawl toward its first position, and a trip means shiftable between a first position wherein it is engageable with the pawl to maintain the pawl in its second position and a second position wherein it clears the pawl, permitting movement of the pawl to its first position.

References Cited by the Examiner

UNITED STATES PATENTS

| | | | |
|---|---|---|---|
| 1,958,884 | 5/1934 | Bonanno | 192—105 X |
| 2,406,142 | 8/1946 | Gebert | 192—56 |
| 2,647,600 | 8/1953 | Anderson | 192—56 |
| 2,948,373 | 8/1960 | Schild | 192—56 |

FOREIGN PATENTS 918,907  10/1954  Germany.

BENJAMIN W. WYCHE III, *Primary Examiner.*

DAVID J. WILLIAMOWSKY, *Examiner.*